United States Patent
Knoop et al.

(10) Patent No.: US 10,954,923 B2
(45) Date of Patent: Mar. 23, 2021

(54) WIND-TURBINE ROTOR BLADE, AND WIND TURBINE HAVING SAME

(71) Applicant: Wobben Properties GmbH, Aurich (DE)

(72) Inventors: Frank Knoop, Aurich (DE); Wilko Gudewer, Norden (DE); Alexander Hoffmann, Emden (DE); Samer Mtauweg, Bremerhaven (DE)

(73) Assignee: Wobben Properties GmbH, Aurich (DE)

( * ) Notice: Subject to any disclaimer, the term of this patent is extended or adjusted under 35 U.S.C. 154(b) by 141 days.

(21) Appl. No.: 16/300,021

(22) PCT Filed: May 9, 2017

(86) PCT No.: PCT/EP2017/061071
§ 371 (c)(1),
(2) Date: Nov. 8, 2018

(87) PCT Pub. No.: WO2017/194545
PCT Pub. Date: Nov. 16, 2017

(65) Prior Publication Data
US 2019/0145378 A1 May 16, 2019

(30) Foreign Application Priority Data
May 10, 2016 (DE) .................. 10 2016 208 051.2

(51) Int. Cl.
*F03D 80/70* (2016.01)
*F03D 1/06* (2006.01)
*F03D 7/02* (2006.01)

(52) U.S. Cl.
CPC ............ *F03D 80/70* (2016.05); *F03D 1/0658* (2013.01); *F03D 7/0224* (2013.01); *F05B 2240/30* (2013.01); *F05B 2240/50* (2013.01); *F05B 2240/52* (2013.01); *F05B 2240/54* (2013.01); *F05B 2250/314* (2013.01);
(Continued)

(58) Field of Classification Search
CPC ....... F03D 80/70; F03D 7/0224; F03D 1/0658
See application file for complete search history.

(56) References Cited

U.S. PATENT DOCUMENTS 2,655,999 A * 10/1953 Basevi .................. B63H 3/082
416/154
3,003,567 A * 10/1961 Flaugh .................. B64C 11/385
416/46
(Continued)

FOREIGN PATENT DOCUMENTS

CN 101451493 A 6/2009
DE 1270411 B 6/1968
(Continued)

*Primary Examiner* — Woody A Lee, Jr.
(74) *Attorney, Agent, or Firm* — Seed Intellectual Property Law Group LLP

(57) ABSTRACT

A wind-turbine rotor blade, comprising a blade root and a blade tip, a flange arranged on the blade root side for fastening the rotor blade to a rotor hub of a wind turbine, and a pitch bearing for adjusting the angle of attack of the rotor blade. The rotor blade has a non-pitched carrier, on which the flange is embodied, wherein the pitch bearing is fastened to the carrier and is spaced apart from the flange toward the blade tip.

18 Claims, 4 Drawing Sheets

(52) U.S. Cl.
CPC ..... *F05B 2260/503* (2013.01); *F05B 2260/79* (2013.01); *F05B 2270/60* (2013.01); *Y02E 10/72* (2013.01)

(56) References Cited

U.S. PATENT DOCUMENTS

| | | | |
|---|---|---|---|
| 3,895,884 A * | 7/1975 | Andrews | F01D 7/00 416/153 |
| 4,150,301 A * | 4/1979 | Bergey, Jr. | F03D 1/0608 290/44 |
| 4,533,297 A * | 8/1985 | Bassett | F03D 1/0658 416/11 |
| 6,428,274 B1 * | 8/2002 | Hehenberger | F03D 7/02 416/153 |
| 6,783,326 B2 * | 8/2004 | Weitkamp | F03D 7/0224 416/1 |
| 8,262,360 B2 | 9/2012 | Whiley et al. | |
| 9,074,581 B2 * | 7/2015 | Bagepalli | F03D 1/0658 |
| 9,239,040 B2 * | 1/2016 | Leonard | F03D 1/0658 |
| 9,513,614 B2 * | 12/2016 | Schnetzka | F03D 7/0272 |
| 9,567,973 B2 * | 2/2017 | Pasquet | F03D 7/0224 |
| 9,631,607 B2 | 4/2017 | Gudewer | |
| 9,702,341 B2 | 7/2017 | Pandya | |
| 9,821,417 B2 * | 11/2017 | Neumann | B66D 1/00 |
| 9,932,964 B2 * | 4/2018 | Janßen | F03D 7/0268 |
| 10,100,804 B2 * | 10/2018 | Haahr | F03D 1/0658 |
| 2006/0067827 A1 * | 3/2006 | Moroz | F03D 1/0675 416/204 R |
| 2009/0148291 A1 * | 6/2009 | Gerber | F03D 1/0658 416/147 |
| 2010/0092288 A1 * | 4/2010 | Sorensen | F03D 7/0236 416/1 |
| 2013/0330194 A1 * | 12/2013 | Jacobsen | F03D 1/06 416/204 R |
| 2013/0330199 A1 | 12/2013 | Bagepalli et al. | |
| 2015/0086369 A1 | 3/2015 | Rohden | |

FOREIGN PATENT DOCUMENTS

| | | | | |
|---|---|---|---|---|
| DE | 10201726 B4 * | 10/2004 | ........... | F03D 1/0658 |
| DE | 102008037605 A1 | 6/2009 | | |
| DE | 102014203508 A1 | 8/2015 | | |
| EP | 2667026 A2 | 11/2013 | | |
| JP | S57-148073 A | 9/1982 | | |
| JP | 2012505342 A | 3/2012 | | |
| JP | 2015-513628 A | 5/2015 | | |
| RU | 1818485 A1 | 5/1993 | | |
| RU | 2506682 C2 | 2/2014 | | |
| WO | 03060319 A1 | 7/2003 | | |
| WO | 2015/128426 A1 | 9/2015 | | |

* cited by examiner

WIND-TURBINE ROTOR BLADE, AND WIND TURBINE HAVING SAME

BACKGROUND

Technical Field

The present invention relates to a wind-turbine rotor blade. The invention further relates to a wind turbine comprising a generator, preferably synchronous generator, a rotor hub, which is coupled to the generator to drive the latter, and one or a plurality of rotor blades fastened to the rotor hub for driving the rotor hub.

Description of the Related Art

Rotor blades or rotor blade arrangements, respectively, of the above-identified type are well known. The blade load is understood to be the forces, which are caused by the dead weight of the rotor blades and which are caused by the wind load acting thereon. In the case of known rotor blade arrangements, the pitch bearings are typically arranged directly on the blade root, wherein the pitch bearing is either connected directly to the rotor hub by means of a first bearing ring or via a flange, and is connected to the rotor blade by means of a second bearing ring on the other side. The entire rotor blade is adjusted directly on the pitch bearing with respect to its angle of attack either via the outer side or inner side of the pitch bearing, or via a further member.

Modern wind turbines are getting larger and larger. By now, blade lengths of common rotor blades significantly exceed the 50-meter mark. Due to the high masses associated therewith and due to the high forces acting on the rotor blades, the pitch bearings are also subjected to correspondingly high loads. This comprises radial forces, axial forces as well as tilt moments. A high bearing friction is created thereby. High drive forces are necessary to drive the pitch movement as a result of the high friction and the high masses and loads, which are to be absorbed.

It is also observed that the connection of the rotor blades to the rotor hub is associated with high costs, because, for a precise fit of the rotor blade on the hub, the latter has to be machined precisely, which is difficult at times as a result of the high component complexity of the rotor hub.

The necessary free travel, thus the horizontal distance between the rotational plane of the rotor blades and the tower surface of the wind turbine towers, is a further problem, which is generally associated with large wind turbines. Due to the fact that most of the towers are embodied to be slightly conical in parts, the maximum rotor blade length is limited.

As a result of the above findings, there is the need for improvements to the known rotor blades.

BRIEF SUMMARY

The present invention relates to a wind-turbine rotor blade comprising a blade root and a blade tip, a flange arranged on the blade root side for fastening the rotor blade to the rotor hub, and a pitch bearing for adjusting the angle of attack of the rotor blade and for absorbing the blade loads.

Provided is an improved rotor blade arrangement with respect to the pitch bearing load, and a cost reduction for the rotor blade arrangements and for the wind turbines comprising such rotor blade arrangements as a whole.

The rotor blade has a carrier, on which the flange is embodied, wherein the pitch bearing is fastened to the carrier and is spaced apart from the flange toward the blade tip. The tilt moments acting on the pitch bearing as a result of the wind force, are a main cause for occurring bearing wear as well as bearing friction and thus for the necessity of pitch bearings and pitch drives, which are dimensioned so as to be large. This approach aims to reduce the resulting tilt moment acting on the pitch bearing. This goal is reached in that the pitch bearing is spaced apart from the flange toward the blade tip. Substantially two area moments thereby act on the pitch bearing, firstly an area moment, which can be traced back to the area force, which extends from the pitch bearing toward the blade tip. Secondly, a counter moment, which can be traced back to the area force between the pitch bearing and the blade root, acts on the pitch bearing in the other direction. The two moments partially compensate one another, so that the resulting tilt moment, which acts on the pitch bearing, is reduced significantly as compared to conventional solutions, in the case of which the pitch bearing is arranged on the rotor blade on the inner end, on the blade root side. This entails a number of advantages. As a result of the lower resulting tilt moments, pitch bearings, which are dimensioned so as to be smaller, can be used, which reduces the weight of the nacelle supported by the wind-turbine tower, together with rotor blades. As a result of the smaller pitch bearing sizes, smaller bearing turning resistance (bearing friction) and smaller masses need to be moved in order to adjust the angle of attack, whereby pitch drives, which are dimensioned so as to be smaller, can also be used. As a whole, this leads to a cost reduction in the production and acquisition of wind-turbine rotor blades and wind turbines.

The carrier, between the pitch bearing and the flange, has a carrier axis, which is angled in such a way with respect to the pitch axis that, in a wind turbine-mounted state of the rotor blade, the pitch axis is spaced apart farther from a tower axis of the wind turbine than the flange. One might say that the rotor blade has a kink in the pitch plane in such an embodiment. As a result of the kink, the outer structure protrudes forward from the nacelle farther than a conventional rotor blade comprising a cone angle on the blade bearing plane would. The free travel between the rotor blades and the tower of the wind turbine is thereby increased, which makes it possible to use rotor blades, which are longer than formerly known. The angle between the pitch axis and the carrier axis preferably lies in a range between 1° and 5°, more preferably in a range between 2° and 10°, and particularly preferably in a range between 3° and 5°.

The carrier is understood to be a structural component, which is embodied in a cone-shaped or shaft-shaped manner, for example, and which preferably has an at least partially polygonal or cylindrical cross section. The carrier is preferably at least partially embodied in a truncated cone-shaped manner.

When reference is made in the context of the invention to a distance between flange and pitch bearing, this is to be understood to be a distance in the range of 0.5 m or more. In preferred embodiments, the distance is 5 m or more, particularly preferably 10 m or more. The rotor blade further has an outer structure, on which the aerodynamic blade surface, around which the wind flows, is embodied, wherein the outer structure is supported on the carrier so as to be capable of being rotated about a pitch axis by means of the pitch bearing. This makes it possible to completely design the non-moved carrier, which is statically fastened to the rotor hub, for stability, because the aerodynamic function is predominantly supported by the outer structure. Depending on the used mounting, the loads are introduced into the carrier and are transferred into his hub. The loads are thus also supported by the carrier.

In the alternative or in addition, however, the carrier can also be embodied aerodynamically on its outer surface, provided that wind flows around it during operation.

In a preferred embodiment of the invention, the pitch bearing has a sole bearing, which absorbs axial, radial and bending forces between outer structure and carrier. Such a bearing is preferably embodied as moment bearing or as, in particular multi-row, four-point bearing.

In an alternative preferred embodiment, the pitch bearing has a first bearing, which absorbs at least axial loads, preferably at least axial loads and radial loads, particularly preferably axial, radial loads and tilt moments, and which additionally has a second bearing as support bearing, which absorbs radial loads. As a function of the bearing concept, the second bearing is equipped to absorb both radial and axial loads, in particular in the case of a fixed/loose bearing solution, as well as in the case of a support mounting (O-arrangement or X-arrangement).

In a further preferred embodiment, the second bearing is embodied as sliding surface for absorbing the radial loads. The sliding surface is preferably embodied on the carrier and/or on the blade, for example by the respective attaching of a strip of a copper alloy or a white metal. The average roughness Ra of the sliding surface preferably lies in a range of ($R_a \leq 1.0$ μm, determined for example according to ISO 25178:2009. In such an embodiment, the first bearing is preferably a moment bearing or four-point bearing, or, in the alternative, a conventional fixed bearing or combination of fixed and loose bearing, while the second bearing as support bearing can for example be a radial bearing.

When reference is made above to embodiments comprising first and second bearing, the first bearing is that, which is spaced apart from the flange as defined above. The second bearing is arranged closer to the blade root than the first bearing. The second bearing is preferably arranged at a distance of less than 0.5 m to the flange plane, particularly preferably directly in the flange plane.

In a further preferred embodiment, the rotor blade has a pitch plane, which is spaced apart from the blade root toward the blade tip, and which divides the rotor blade along the pitch plane into a non-pitched and a pitched part. On the one hand, this embodiment makes it possible to arrange the carrier and the outer structure next to one another, wherein the carrier, based on the circumferential movement of the rotor blades, is arranged radially inside, on the hub-side of the wind turbine, and the outer structure is mounted thereto radially outside thereof via the pitch bearing.

In a first preferred embodiment, the outer structure is coupled to an inner ring of the pitch bearing. In this embodiment, a shaft end, which is accommodated by the pitch bearing and is supported inside the carrier, can for example be fastened to the outer structure. The shaft end is preferably driven directly by a motor-driven pitch drive or by means of the inner ring of the pitch bearing in order to adjust the pitch angle of the outer structure. In this embodiment, the carrier is a hollow body, with which the shaft end engages, and preferably has a part of the outer surface of the rotor blade.

In a second alternative embodiment, the outer structure is coupled to an outer ring of the pitch bearing. This embodiment makes it possible to embody an overlap area, in which the carrier is arranged inside the outer structure, between the outer structure and the carrier. In such an embodiment, the end of the overlap area, which faces the blade root, then defines the pitch plane. The outer structure is placed above the carrier quasi like a housing and covers it in the overlap area. The overlap area can extend substantially to the blade root, wherein, in such an embodiment, viewed from the outside, the blade works like a conventional bearing pitched on the blade root, but does in fact require significantly lower friction and thus lower pitch forces as a result of the moment balancing. This embodiment also has a further advantage: When the carrier is dimensioned sufficiently so that it becomes walkable, the rotor blade can be walked from the inside at least to the pitch plane in the mounted state. As a result of the lightweight construction, this is not always possible in the case of conventional rotor blades, which are frequently made of fiber composites. However, the carrier deflects the mechanical stress, which would be caused by being walked on, from the outer structure, which is designed to be lightweight.

The outer structure is preferably embodied in several parts and has a first part, which extends from the pitch bearing, in particular the first bearing of the pitch bearing, to the blade tip, as well as a second part, which extends from the pitch bearing, in particular the first bearing of the pitch bearing, to the pitch plane. Particularly preferably, the first part and the second part of the outer structure are connected to one another by means of a rotating ring, in particular the outer ring, of the (first) pitch bearing, for example in that they are fastened to the pitch bearing on opposite front faces of the outer ring of the pitch bearing. Particularly preferably, the second part of the outer structure extends all the way to the vicinity of the flange plane.

In a further preferred embodiment, the rotor blade has a non-pitched blade covering, which extends between the blade root and the outer structure substantially to the pitch plane, in particular adjacent to the overlap area.

Such a blade covering can preferably also be embodied so as to be aerodynamically optimized, so as to ensure a flow resistance, which is reduced as much as possible, and as little turbulence formation as possible, for a certain angle of attack range in the mounted state of the rotor blade. The blade covering could also be structurally connected to the carrier or could be embodied in one piece therewith.

In the case of a wind turbine of the above-identified type, the rotor blades are embodied according to one of the above-described preferred embodiments. As a result of the lower loads on the pitch bearings and the pitch drives, a reliable mode of operation with simultaneously reduced costs of the wind turbine can be expected. With regard to the further advantages and preferred embodiments of the wind turbine according to the invention, reference is made to the above explanations relating to the rotor blades.

The wind turbine is preferably further developed, in that a pitch drive comprising a drive pinion, which engages with a gearing, is assigned to each rotor blade.

The gearing is preferably arranged on the outer structure or on a shaft end provided on the outer structure, or directly on the moved bearing ring of the bearing or of one of the bearings of the pitch bearing, respectively. The gearing is preferably integrally molded on the bearing ring.

The gearing is preferably embodied along an angular range of between 60° and 270°, preferably between 90° and 180°.

More preferably, the gearing has a plurality of segments, which are arranged in a row and which, together, cover the protruding angular area.

The invention will be described in more detail below by means of preferred exemplary embodiments with reference to the enclosed figures.

DETAILED DESCRIPTION

Figure 1:
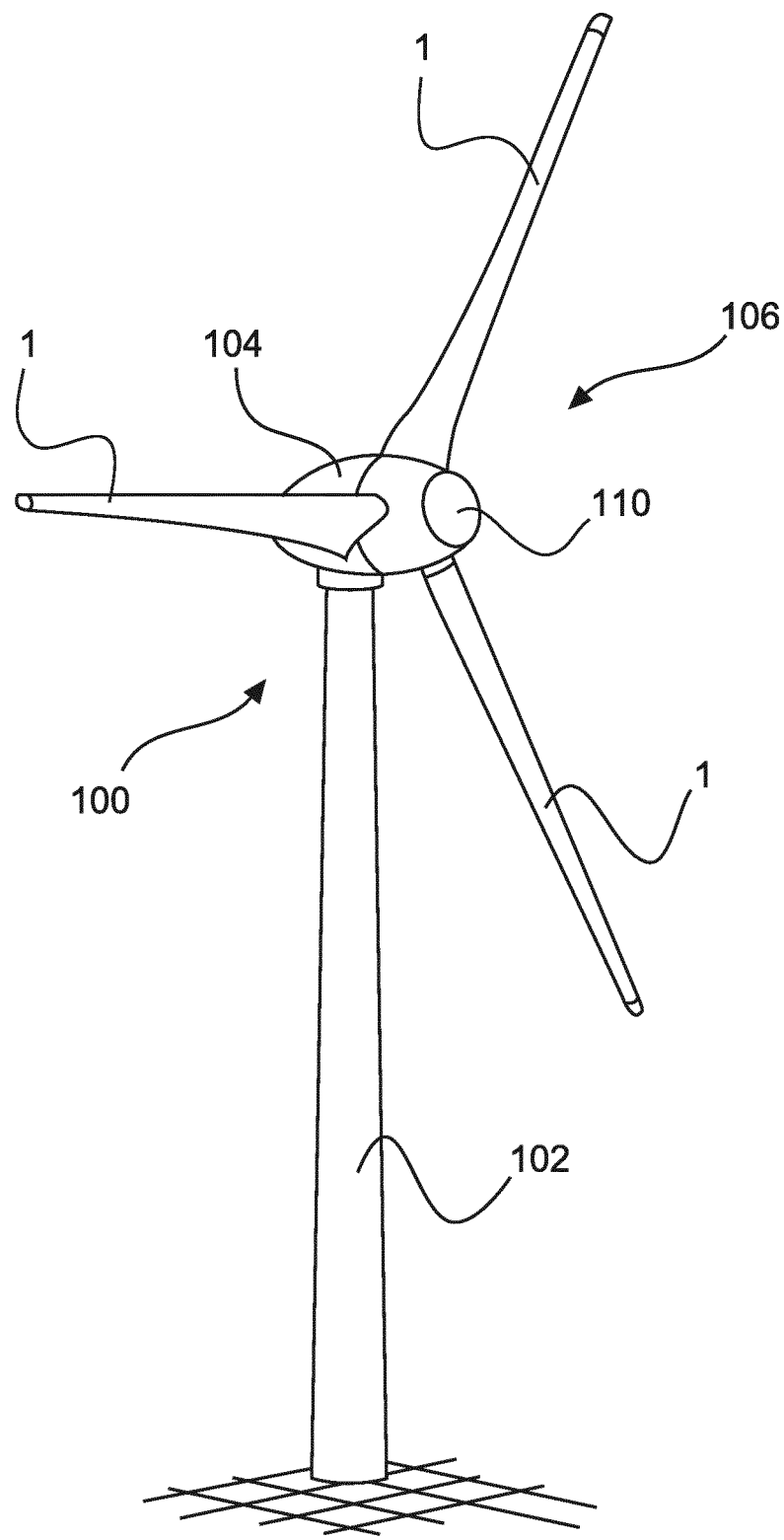
FIG. 1 shows a schematic wind turbine in a first exemplary embodiment.

FIG. 1 shows a wind turbine 100 comprising a tower 102 and a nacelle 104. A rotor hub 106 comprising three rotor blades 1 and a spinner 110 is arranged on the nacelle 104. During operation, the rotor 106 is made to rotate by means of the wind and thus drives a generator in the nacelle 104.

Figure 2A:
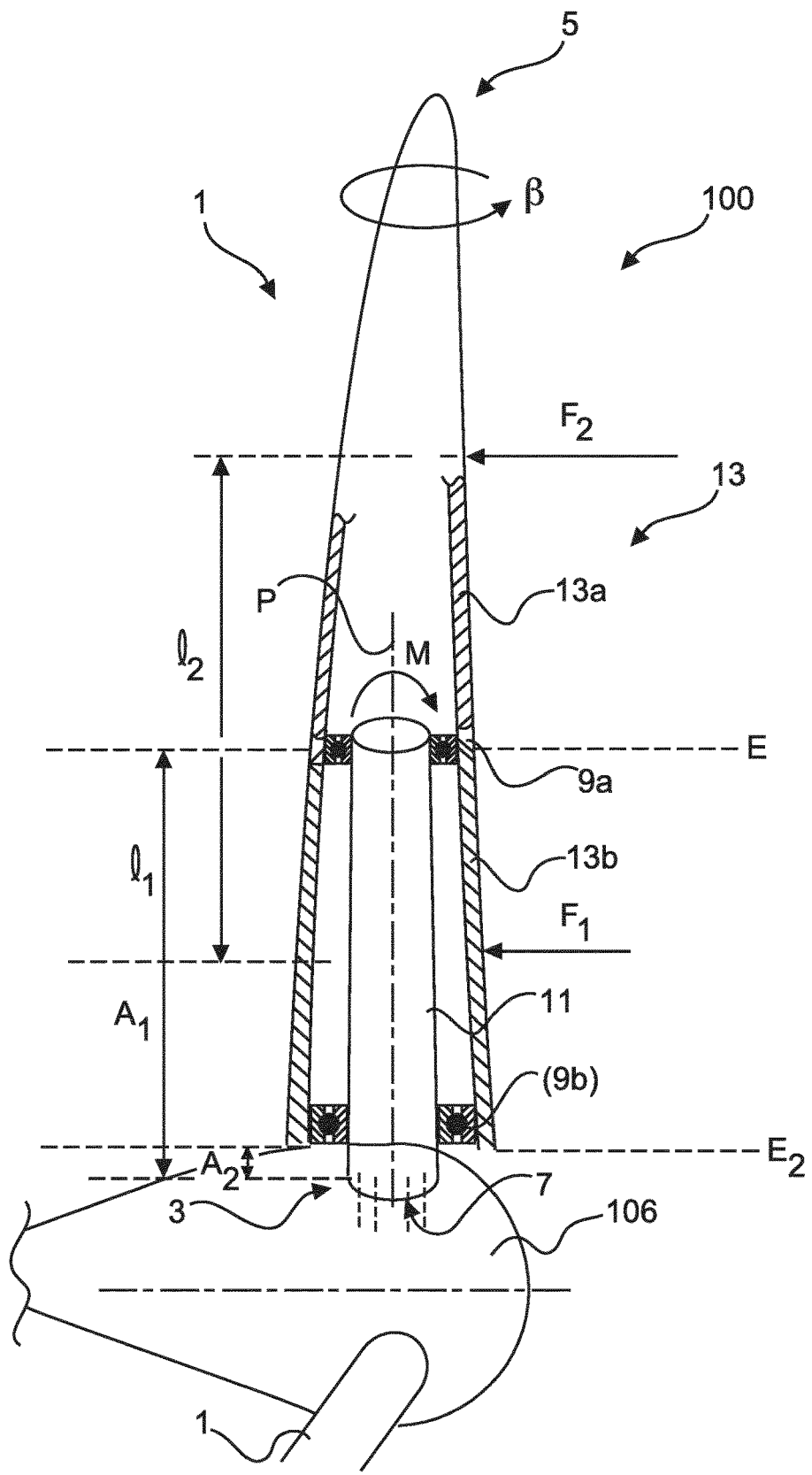
FIG. 2a shows a partial illustration of the wind turbine according to FIG. 1 comprising a rotor blade according to a first exemplary embodiment.

FIG. 2a shows the rotor blade 1 according to FIG. 1 in a schematic partial sectional view. The rotor blade 1 has a blade root 3 and a blade tip 5. On the blade root side end, the rotor blade 1 has a flange 7 for fastening to the rotor hub 106.

The rotor blade 1 has a pitch bearing 9a. The pitch bearing 9a is spaced apart from the flange 7 at a distance A1. The pitch bearing 9a is preferably embodied as moment or (multi-row) four-point bearing. The pitch bearing 9a is fastened by a carrier 11 to an inner bearing ring. The carrier 11 has the flange 7 and is fixedly anchored to the rotor hub 106. On its outer ring, the pitch bearing 9a is fixedly connected to an outer structure 13, so that the outer structure 13 is supported so as to be capable of being rotated relative to the carrier 11 by means of the pitch bearing 9a. The pitch bearing 9a defines a pitch axis P, about which the rotor blade 1 or the outer structure 13 thereof, respectively, can be adjusted about the angle β in the angle of attach.

In a preferred alternative, the pitch mounting additionally has a support bearing 9b, which is arranged on the carrier 11 at a distance $A_2$ to the flange 7 and which additionally supports the outer structure 13.

The outer structure 13 is preferably embodied as a homogenous part, in the case of which an overlap area between the carrier 11 and the outer structure 13 results in the area 13b. In a preferred alternative, the outer structure 13 is embodied in several parts and has a first part 13a and a second part 13b, which are either coupled to one another or which are each coupled to one another by means of the bearing 9a.

In the area of an overlap between the outer structure 13 and the carrier 11, the pitch plane moves toward the blade root 3 in the direction of the flange 7 to the extent of the design of the overlap. In the shown exemplary embodiment of FIG. 2a, the pitch plane would be at the location identified by $E_2$ in the case of an assumed homogenous outer structure 13, in which the areas 13a and 13b rotate.

The mode of operation of a pitch mounting according to the invention will be explained below under the assumption that the pitch mounting only has the pitch bearing 9a: On the one hand, the force $F_2$ acts on the rotor blade in the area 13a of the outer structure, and the force $F_1$ acts in the area 13b.

The force $F_1$ has a lever arm $I_1$ to the pitch bearing 9a, while the force $F_2$ has a lever arm $I_2$ to the pitch bearing 9a. The resulting tilt moment M results according to the equation $M=F_2 \times I_2 - F_1 \times I_1$. In comparison, the resulting tilt moment would be significantly larger, if the pitch mounting were arranged directly on the flange 7. The moment would then result from the sum of the force $F_1$ multiplied by its distance to the flange, and the sum $F_2$ multiplied by its distance to the flange 7. It is immediately obvious that that resulting movement would be larger by a wind turbine multiple than the resulting tilt moment according to the invention.

The stability of the rotor blade 1 is additionally improved by the use of the additional pitch bearing 9b.

Figure 2B:
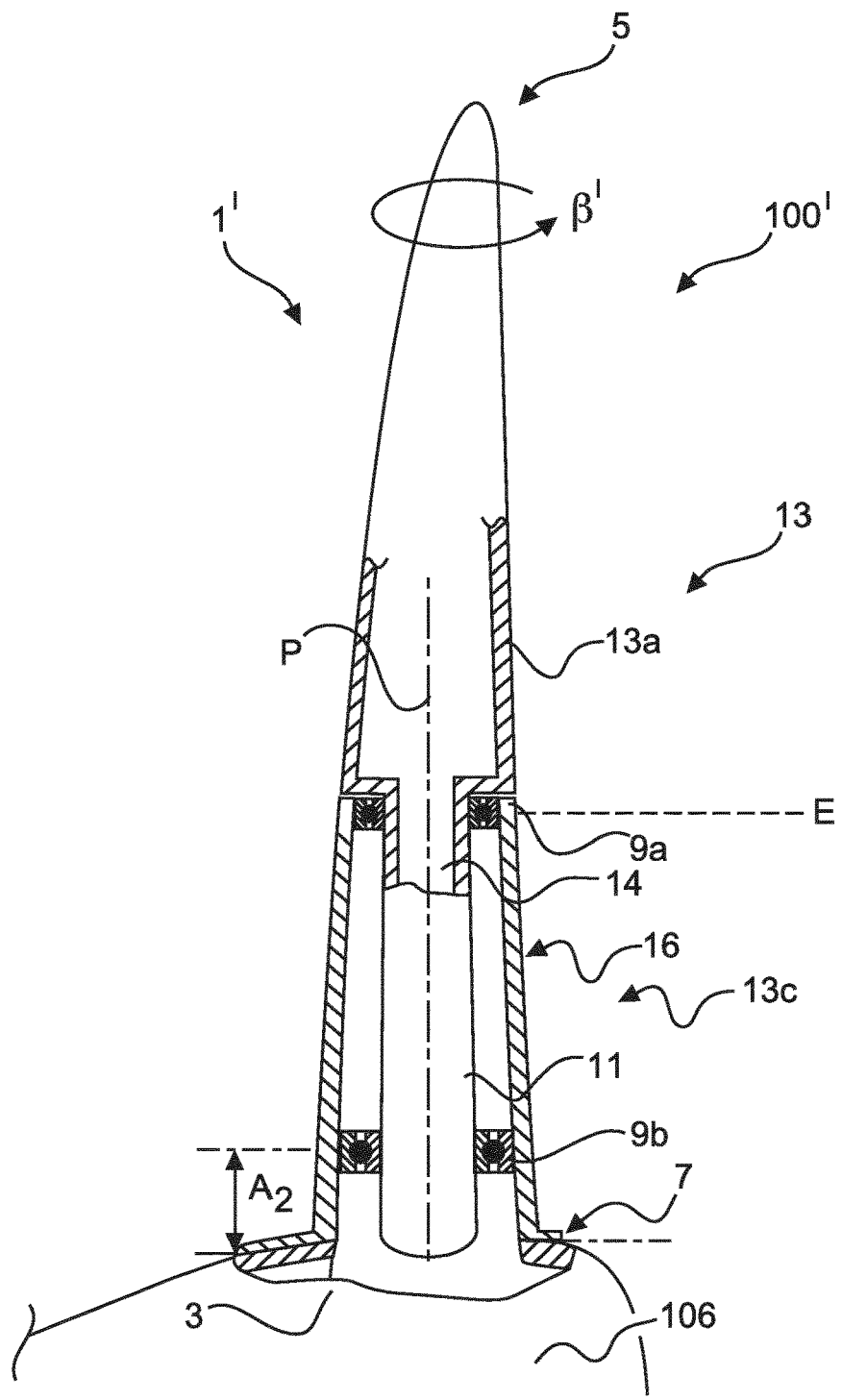
FIG. 2b shows a partial illustration of the wind turbine according to FIG. 1 comprising a rotor blade according to a second exemplary embodiment.

FIG. 2b shows an embodiment of a rotor blade 1', which is an alternative to FIG. 2a, for a wind turbine 100'. In that embodiment, in which only the area 13a acts as outer structure, the carrier 11 is no longer embodied as being located on the inside, but as hollow body being located on the outside and preferably acts as blade coating 16 on the outside between the pitch plane E and the blade root. The outer structure 13a has a shaft end 14, which is rotatably supported in the carrier 11. The area 13a is the pitched part of the rotor blade, while a part 13c, which is not pitched, is embodied between pitch plane E and the flange 7.

In the exemplary embodiment according to FIGS. 2a, b, the pitch axis P corresponds approximately to a longitudinal axis of the rotor blade, which extends from the middle of the blade root 3 to the middle of the blade tip 5.

Figure 3:
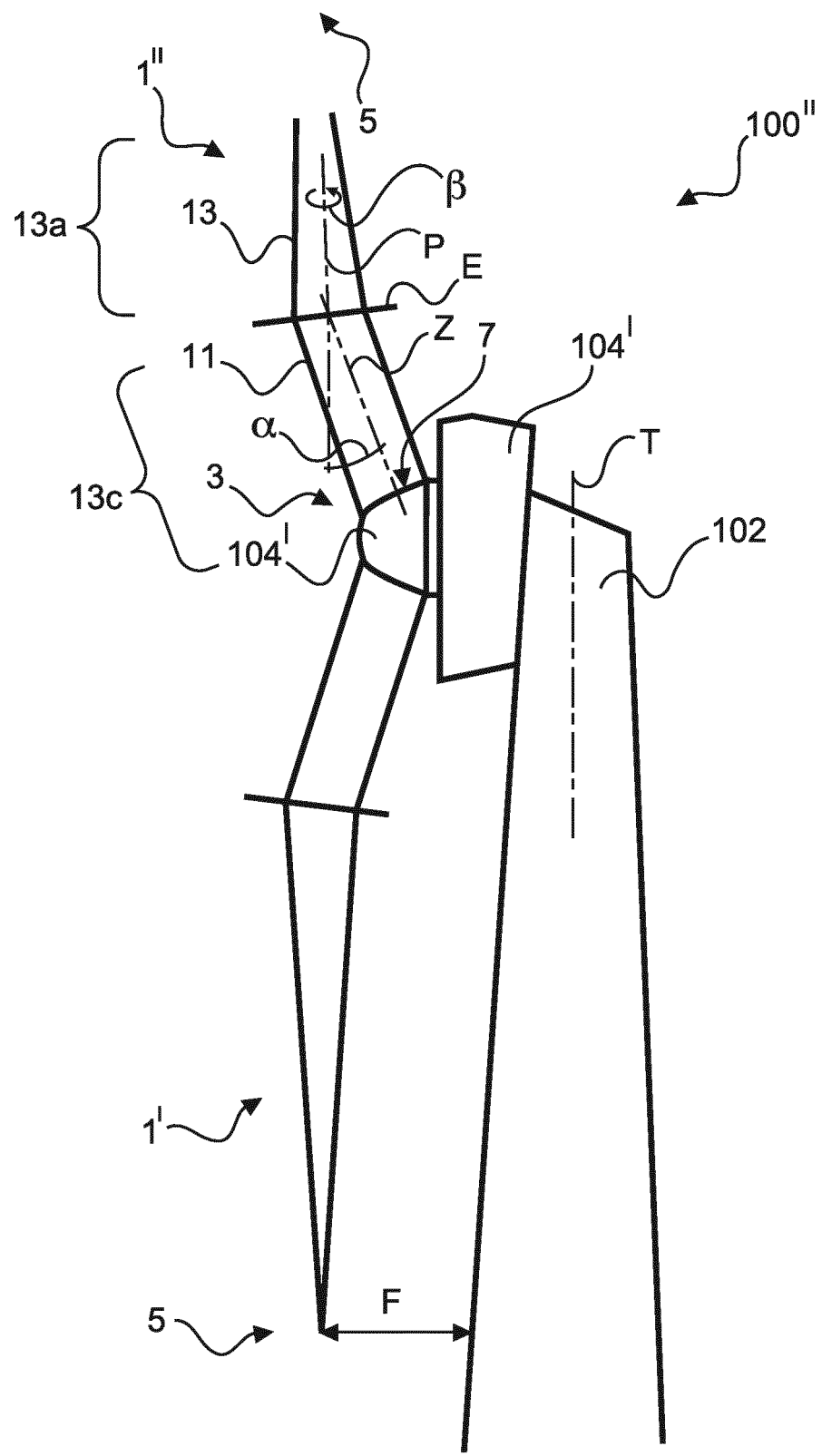
FIG. 3 shows a wind turbine according to the invention according to a preferred exemplary embodiment comprising a rotor blade according to the invention.

In the exemplary embodiment shown in FIG. 3, this is somewhat different. FIG. 3 also illustrates a wind turbine 100" according to the invention, but comprising a rotor blade 1", which differs from the illustration according to FIG. 2. The rotor blade 1" also has a blade root 3 and a blade tip 5. A flange 7 is embodied on a carrier 11 and is connected to the rotor hub 106. The outer structure 13 of the rotor blade 1" can also be adjusted by an angle β about the pitch axis P. The rotor blade 1" is divided into a non-pitched part 13a and a pitched part 13c by means of the (non-illustrated) pitch mounting in a pitch plane E, wherein, as a result of the nonexistent overlap, the non-pitched part is characterized by the carrier 11, and the pitched part by the outer structure 13.

The significant difference to the illustration according to FIG. 2 is that the carrier 11, which has a carrier axis Z, is angled with the carrier axis Z by an angle α relative to the pitch axis P, so that the outer structure 13 and the pitch axis P are spaced apart farther from a vertical axis T of the tower 102 of the wind turbine 100' than the flange 7 on the blade root side end of the rotor blade 1". As a result of this angle α, the rotor blades 1" are moved away farther from the vertical axis T of the tower 102 of the wind turbine 100', whereby the free travel F of the tower is increased while the rotor blade length remains the same or the rotor blade 1" can be embodied so as to be longer until reaching a minimally prescribed free travel of the tower, respectively. As a result of the design according to the invention, a highly compact nacelle or machine housing size, respectively, is additionally attained, suggested by reference numeral 104'.

It follows from the above discussions that a wind turbine, which is improved in its function load situation, can be attained by complying with the aspects according to the invention.

The invention claimed is:

1. A wind-turbine rotor blade, comprising:
a rotor blade body including a blade root and a blade tip;
a flange arranged on the blade root side for fastening the rotor blade to a rotor hub of a wind turbine;

a pitch bearing for adjusting an angle of attack of the rotor blade; and a non-pitched carrier, wherein the flange is embodied on the non-pitched carrier, wherein the pitch bearing is fastened to the non-pitched carrier and is spaced apart from the flange toward the blade tip, wherein the non-pitched carrier, between the pitch bearing and the flange, has a section, which is angled in such a way with respect to a pitch axis of the rotor blade body that, in a wind turbine-mounted state of the rotor blade, the pitch axis of the rotor blade body is spaced apart farther from a tower axis of the wind turbine than the flange, and wherein in the wind turbine-mounted state, the non-pitched carrier has a carrier axis that is angled towards a front of the rotor hub, and the pitch axis of the rotor blade body is angled from the carrier towards the tower axis.

2. The rotor blade according to claim 1, further comprising an outer structure and an aerodynamic blade surface being formed on the outer structure, wherein the outer structure is supported on the non-pitched carrier so as to be capable of being rotated about a pitch axis by the pitch bearing.

3. The rotor blade according to claim 2, wherein the pitch bearing has a sole bearing configured to absorb axial loads, radial loads, and tilt moments between the outer structure and the non-pitched carrier.

4. The rotor blade according to claim 2, wherein an overlap area is provided between the outer structure and the non-pitched carrier.

5. The rotor blade according to claim 4, further comprising a shaft end supported in the non-pitched carrier so as to be capable of being rotated by the pitch bearing, and is supported on the outer structure.

6. The rotor blade according to claim 4, wherein the non-pitched carrier is arranged inside the outer structure.

7. The rotor blade according to claim 6, comprising a blade covering that extends between the blade root and the outer structure substantially to a pitch plane.

8. The rotor blade according to claim 1, wherein the pitch bearing has a first bearing and a second bearing, each configured to absorb loads.

9. The rotor blade according to claim 8, wherein the first bearing is spaced farther apart from the flange than the second bearing.

10. The rotor blade according to claim 8, wherein the loads include at least one of: axial loads, radial loads, and tilt moments.

11. The rotor blade according to claim 1, further comprising a pitch plane that is spaced apart from the blade root toward the blade tip, wherein the pitch plane divides the rotor blade into a non-pitched part and a pitched part.

12. A wind turbine, comprising:
a generator,
a rotor hub coupled to the generator, and
at least one rotor blade fastened to the rotor hub, wherein the at least one rotor blade is the rotor blade according to claim 1.

13. The wind turbine according to claim 12, wherein the at least one rotor blade comprises a pitch drive comprising a drive pinion configured to engage with a gearing.

14. The wind turbine according to claim 13, wherein the gearing is arranged on an outer structure of the at least one rotor blade, on a shaft end provided on the outer structure, or directly on the pitch bearing.

15. The wind turbine according to claim 13, wherein the gearing is embodied along an angular range of between 60° and 270°.

16. The wind turbine according to claim 13, wherein the gearing has a plurality of segments arranged in a row.

17. The wind turbine according to claim 12, wherein the generator is a synchronous generator.

18. The wind turbine according to claim 12, wherein the at least one rotor blade is a plurality of rotor blades.

* * * * *